UNITED STATES PATENT OFFICE.

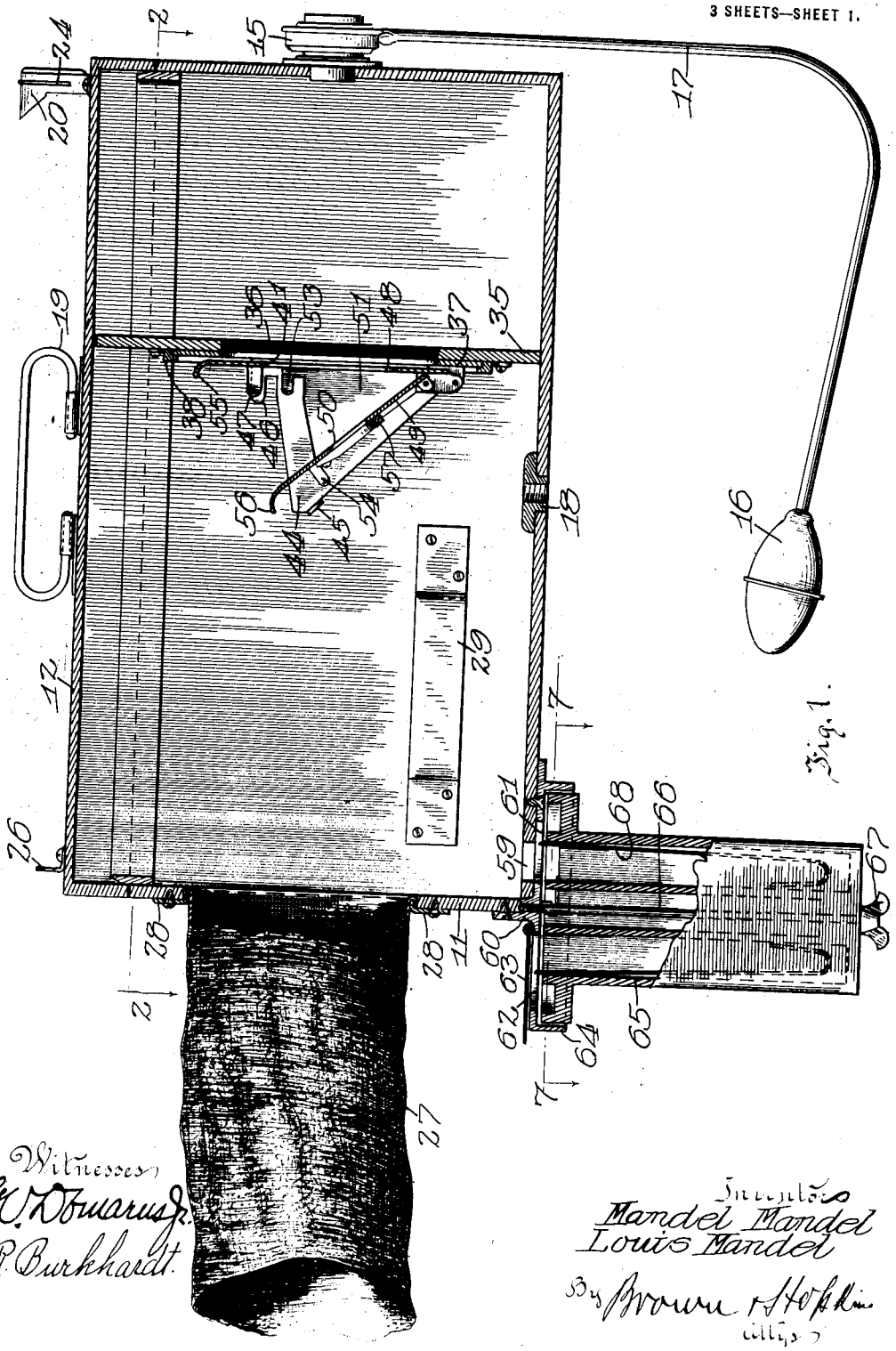

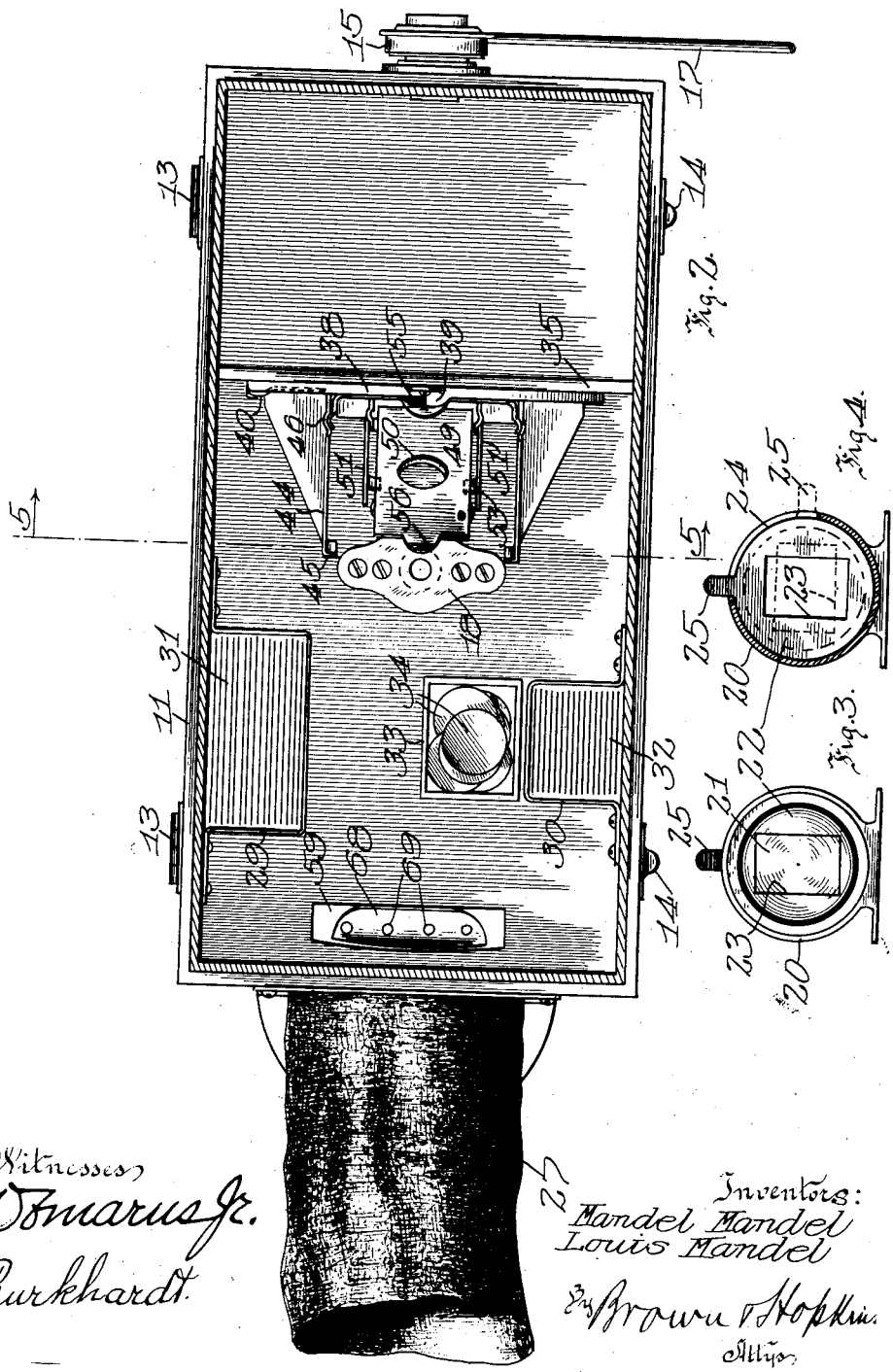

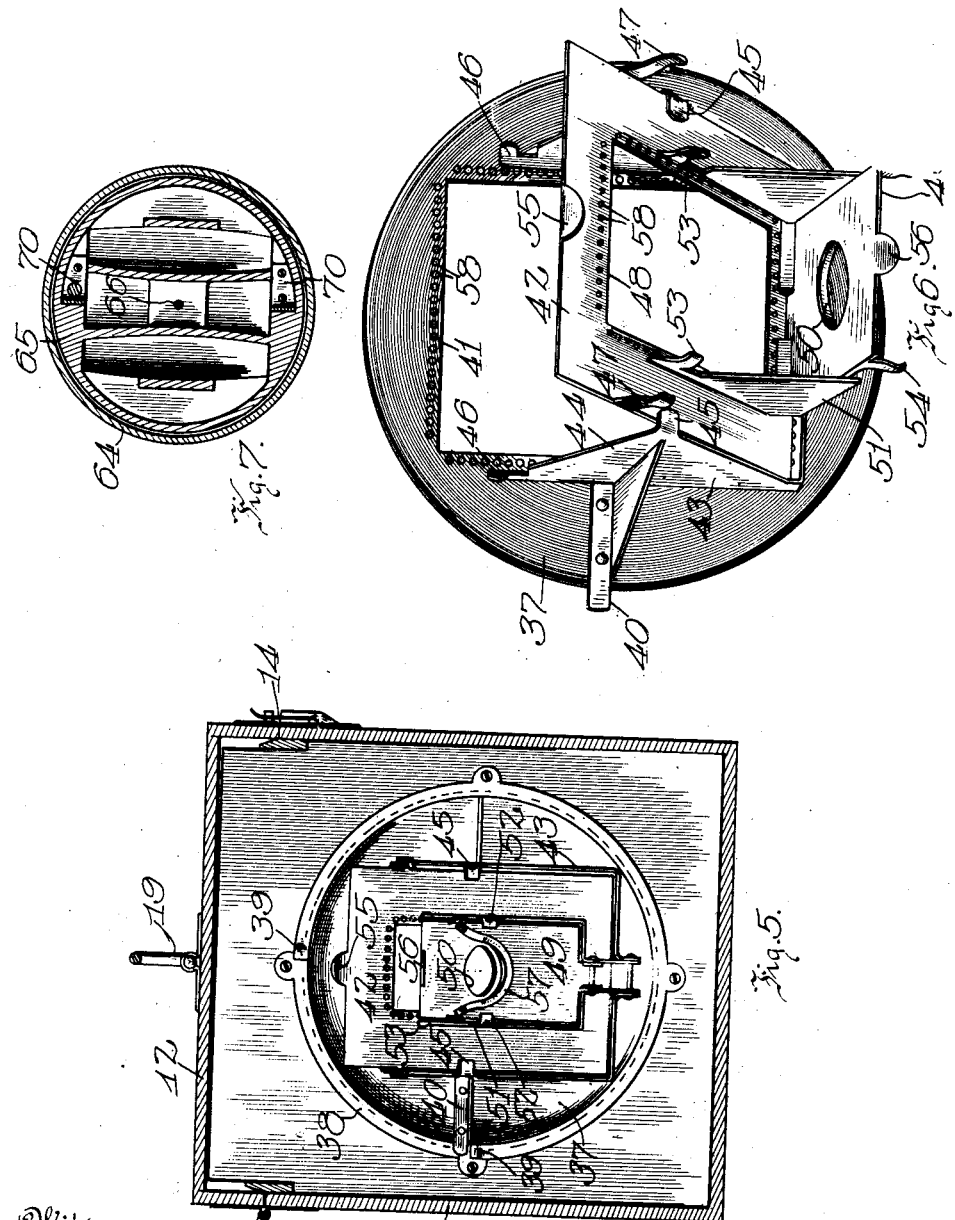

MANDEL MANDEL AND LOUIS MANDEL, OF CHICAGO, ILLINOIS.

CAMERA.

1,170,768.   Specification of Letters Patent.   Patented Feb. 8, 1916.

Application filed April 12, 1912. Serial No. 690,260.

*To all whom it may concern:*

Be it known that we, MANDEL MANDEL and LOUIS MANDEL, citizens of the United States, residing at Chicago, in the county of Cook and State of Illinois, have invented certain new and useful Improvements in Cameras, of which the following is a specification.

This invention relates to cameras, and more particularly to those of a class which is known as magazine cameras, in which a sensitized card or member is placed in an exposure position.

The principal object of the invention is to provide an improved, simple and inexpensive camera of this class in which a number of sensitized cards or pieces of different sizes may be stored in compact form within a chamber of the camera which is closed to the light and to the interior of which access may be had, also closed to the light, at any and all times, as by the hand of the operator, to place the sensitized members in exposure position one at a time, and to remove them therefrom and to place them in a fluid receptacle from which they may be removed one or more at a time without affecting the remainder of the sensitized members within the compartment of the camera.

Another object of the invention is to provide an improved device of this class which is simple in construction and effective and efficient in operation.

For the attainment of these ends and the accomplishment of other new and useful objects, as will appear, the invention consists in the features of novelty in the construction, combination and arrangement of the several parts generally shown in the accompanying drawings and described in the specification, but more particularly pointed out in the appended claims.

In the drawings Figure 1 is a sectional view in elevation of a camera of this class constructed in accordance with the principles of our invention; Fig. 2 is a plan view of such camera taken on the line 2—2 of Fig. 1; Fig. 3 is a view in elevation of a centering lens or finder disposed on top of the camera; Fig. 4 is a sectional view of the same showing the construction whereby the position of an apertured member of the finder may be changed; Fig. 5 is a view in elevation taken on the line 5—5 of Fig. 2, and showing the preferred construction of the exposure device; Fig. 6 is a perspective view of the exposure device; Fig. 7 is a sectional plan view taken on the line 7—7 of Fig. 1; and showing the preferred construction of a fluid receptacle secured to the camera.

This invention is designed to be used for the production of pictures "while you wait," and in such production to make them of cards of different sizes without necessitating the use of a dark room, or without re-loading the camera in such a dark room at each time an exposure is made. The novelty resides in the combination and the features set forth in the claims hereto appended. In the specific construction disclosed the camera box is formed with separate compartments, one or both of which are closed to the light, and to one of which compartments access may be had by the hand of an operator, whereby he is enabled to select and place in exposure position a number of sensitized members of different sizes, and to remove them from such exposure position and to place them in a suitable solution or bath without exposing them to the light, and without exposing the remainder of the sensitized members in the compartments to the light. Another feature of importance is the means by which the exposed members may be recovered from the fixing bath without admitting light to the interior of the camera compartment.

Referring now more particularly to the drawings, a camera box 11 is provided with a lid or cover 12, which is secured thereto by hinges 13 or other suitable means, and held in place by latches 14. This box may be of any desired or suitable material and constructed so that when the lid is secured in position the interior of the box is closed to the light. At one end of the box is disposed a lens 15, of any desired or suitable construction, which is provided with an operating bulb 16, together with the necessary tubular connections 17 to effect the operation of the lens. Any other operating mechanism may be provided, inasmuch as the novelty of the present invention does not reside in this feature. A threaded member 18 is secured to the box 11, preferably in the bottom thereof, which is adapted to secure the camera to a tripod or other suitable supporting device, and at the top of the box, preferably attached to the lid, is a carrying handle 19, which is secured thereto in any desired or suitable manner.

On the front end of the box and preferably on top of the lid, there is positioned a centering lens or finder 20, which is preferably disposed directly over the lens 15 in the end of the box. This finder 20 comprises a casing member (see Figs. 3 and 4) which contains a lens 21, and a rotatable partition 22, which is provided with an aperture 23 substantially preferably oblong or rectangular in form. The casing is also provided with a slotted portion 24, through which an ear 25 formed integral with the partition 22 extends, and by means of which the partition may be rotated in any desired or suitable position, the limiting positions being preferably as shown by the full and dotted positions in Fig. 4. At the rear end of the camera and in line with the finder 20 is a peep sight 26, by means of which sight and the finder the camera is directed toward the object which it is desired to photograph.

At the rear of the camera and secured thereto in any desired or suitable manner to an opening in the box of the camera is a sleeve 27, composed of fabric or any other suitable material impervious to light. This sleeve and the opening in the box of the camera is of a size to permit the hand of the operator of the camera to be inserted through the sleeve and within the interior of the camera through the opening in the end of the box, the sleeve at this time forming a passage way closed to the light, so that access may be had to the interior of the camera at any time without exposing the interior of the camera to the light. This sleeve may be secured in position in any suitable manner, such, for example, as by means of the clamping ring 28, which is fixed to the box by any suitable fastening devices.

The interior of the camera is provided with holders 29 and 30 preferably formed by bending strips of metal or other suitable material and securing them to the sides of the camera box. These holders are adapted to contain the sensitized members 31 and 32, which are preferably of different sizes, and another holder 33, may be positioned in the camera and adapted to contain sensitized members 34 of any different size or kind desired.

Disposed within the camera box and suitably fixed in position is a partition 35, which substantially divides the interior thereof into separate compartments, one of which contains the said holders and to which access may be had from without through the sleeve 27, and the other of which may be designated as the exposure compartment, and in the end of which the exposure lens 15 is disposed. The partition 35 is provided with an aperture or opening 36, and secured to the partition and adapted to cover the opening is an exposure device. This exposure device comprises a number of supports, one hinged upon the other, and the whole rotatably mounted on the partition. The preferred construction of this exposure device as shown in the accompanying drawings comprises a plate 37 preferably circular in form, which is retained in connection with the partition by means of a flanged member 38 in which the plate member 37 is rotatable. The retaining rim or flanged member 38 is preferably provided with projecting lugs 39, and the plate with a detent 40 to engage the lugs 39, whereby the rotative movement of the plate 37 is limited in both directions of rotation. Preferably these limiting stops are substantially 90 degrees, or one-quarter of a revolution apart, so that the plate may be presented with one axis horizontal or vertical as desired. This plate 37 is provided with an exposure aperture or opening 41, which is preferably longer in one direction than another, so that an exposure may be made with the longer axis of the opening in a horizontal or vertical position. Pivotally connected to the plate 37 is a perforated member or support 42, which is preferably slightly larger in size than the exposure aperture 41 in the plate 37, so that when the support 42 is placed over the opening 41 it will be substantially closed. Secured to the plate 37 and disposed about the opening 41 around the edge of the pivoted support 42 is an extending flange 43, which is also formed with an extending portion 44 provided with inwardly projecting lugs 45. These lugs 45 are adapted to engage the support 42 when it is rotated away from the plate 37, and to limit the movement thereof in an outward direction. This flanged portion 43 is also provided with engaging lugs or ears 46, which are adapted to engage corresponding lugs or ears 47, connected to or formed integral with the support 42. These ears 46 and 47 are preferably formed with a slight bend, so that when they are brought into engagement the pivoted support 42 is removably locked in engagement with the plate 37. The pivoted plate or support 42 is also provided with an opening 48, and pivotally mounted thereon is a second support 49 provided with a perforation or opening 50. This plate 42 is provided with upright flange 51, having the engaging lugs 52 and 53 similar to the lugs 45 and 46, respectively, of the flange 43, the lugs 52 being adapted to limit the outward movement of the support 49, as previously described, and the support 49 being provided with lugs 54 to engage with the lugs 53 and to hold the support in position. Another function of the flanges 43 and 51 is to position the sensitized pieces or members to be exposed through the lens so that they will be centered in the exposure apertures, thereby excluding the light from the storage compartment and preventing the unexposed members contained therein from being exposed to the light when a sensitized piece is placed in exposure position. These pivoted supports 42 and 49 are preferably provided at the top edge with bent clips or ears 55 and 56, by means of which the pivoted supports may be readily separated from the member to which they are pivoted and thereby to facilitate the positioning of a sensitized piece in the exposure position.

In the preferred construction the exposure apertures in the plates or supports are preferably rectangular in shape, so that exposures may be made with the greater dimension in either a horizontal or a vertical position. In the preferred construction and as illustrated in the present exemplification of the invention, it is contemplated that the last pivoted support as the support 49 be provided with an opening 50, which is circular in form, the rear of the support being provided with a grooved retaining flange 57, which is adapted to receive and to hold round members in connection with the support 49 in exposure position in the opening 50. This opening is for the purpose of exposing round sensitized pieces, such as buttons and the like, and the flange is preferably formed of magnetized metal, so that a metal button, or a button composed of or provided with metal capable of being attracted thereby, may be held in position over this exposure opening 50.

The edges of the exposure apertures may be provided with any desired fanciful or decorative design, which will of course appear upon the edge of the exposed member. In the present exemplification of the invention this is exemplified by the perforations 58.

The bottom of the camera adjacent the rear thereof is provided with an opening or slot 59 through which exposed members may be discharged from the camera into a developing bath. It is necessary that this bath be contained in a suitable receptacle, which is closed to the light and which prevents light from being admitted through the opening 59 to the interior of the camera. A flange plate 60 is therefore provided which is secured to the end of the camera box, and which extends outwardly from the end thereof substantially half of the width of the plate 60. This plate is provided with an aperture 61 which registers with the opening 59 in the bottom of the camera box, and with an opening 62 which is disposed in the extending portion of the plate and which latter is provided with a hinged lid 63. The flanged portion 64 extends downwardly and a receptacle 65 is positioned beneath the plate 60, and within the flanges 64. The receptacle 65 is composed of any desired or suitable material, and is preferably provided with two compartments oppositely disposed, so that one of them registers with the opening in the bottom of the camera, while the other one registers with the opening 62 in the extending portion of the plate 60. This receptacle is rotatable in the plate 60, and is preferably secured in position by means of a threaded member 66 provided with a thumbscrew 67, the threaded member extending through the receptacle from the bottom thereof and being threaded into the flange plate 60 substantially at the center thereof, so that the flanged portion 64 may extend around the upper portion of the receptacle 65 as closely as possible to exclude light from the receptacle, and from the interior of the camera. To facilitate the removal of exposed members from within the compartments of the receptacle, they are provided with lifters 68 of any desired or suitable material, which are preferably provided with perforations 69 (see Fig. 2) to permit the bath or solution to drain more rapidly from the articles or members as they are removed from the compartments.

It is evident that in order to remove an exposed member from within the camera it is necessary to drop it through the opening 59 into registering compartment of the receptacle 65 and then to rotate the receptacle until this compartment registers with the opening 62 in the extending portion of the plate 60, whereupon the device 68 may be withdrawn carrying with it the exposed article. It is also evident that by having a number of separate compartments in the receptacle the baths contained therein may be of different strength for different purposes. In the present exemplification of the invention the receptacle 65 is provided with stops 70 to limit the movement of the receptacle in either direction, so that the compartments may be brought more readily into registering position with the opening in the bottom of the camera box.

In operation it is necessary, of course, to fill the holders 29, 30 and 33 with the sensitized members. This may be done in a dark room or the coverings of packages containing the sensitized material may be removed through the sleeve impervious to light and the camera is then ready for operation. The lens is of course closed and a sensitized piece of the proper size is selected by the hand of an operator and placed in position in the exposure device. In this position the storage compartment of the camera is closed from light even when the lens is open, and as soon as the sensitized member has been exposed the lens is closed and the exposed member may be removed from the exposure device and placed in the receptacle 65 through the opening 59 and the bottom of the camera box. From the receptacle it may be removed as previously explained and in the well known manner. It is to be understood, of course, that the said operations are performed by the operator by the sense of touch alone, for it is manifestly impossible for him to see the interior of the camera, but with very little practice it is possible for him to acquire the necessary knowledge to carry out these operations by the sense of touch alone, and without actually seeing the operations carried out. It will also be evident that it is possible to replenish the storage compartment without employing a dark room, by inserting packages of sensitized material through the sleeve and removing the coverings therefrom after the packages are within the camera. It is also evident that pictures of various sizes may be made one at a time, and that these pictures may be made with the long axis horizontal or vertical, by reason of the fact that the entire exposure device is rotatable in the partition.

The sighting or finding device in the top of the camera makes it possible to shift the camera accurately in the proper direction, and to position it with respect to the exposure to be made. By means of the adjustable front lens or finder the subject may be accurately centered upon the exposed member.

What we claim as new is:—

1. A camera having separate compartments, a light-tight entry to the interior of one compartment, and a closable device to provide communication between the compartments.

2. A camera having a partition forming two separate compartments, a lens in the walls of one compartment, means impervious to light to form an entry to the interior of the other compartment, and means to open the last named compartment to the first named compartment.

3. A camera having an apertured partition forming compartments, a lens in the end of one compartment, means impervious to light in the end of the other compartment to form an entry thereto, and an exposure device operable from the last named compartment.

4. A camera having an apertured partition forming compartments, a lens in the end of one compartment, means impervious to light in the end of the other compartment to form an entry thereto, and an exposure device secured to the partition and operable from the last named compartment.

5. A camera having an apertured partition forming compartments, a lens in the end of one compartment, means impervious to light in the end of the other compartment to form an entry thereto, and an exposure device secured to the partition and operable from the last named compartment to open and close the aperture.

6. A camera having an apertured partition forming compartments, a lens in the end of one compartment, a sleeve impervious to light in the end of the other compartment to form an entry thereto, and an exposure device operable to open and close the aperture from within the last named compartment through the sleeve.

7. A camera having an apertured partition forming compartments therein, an exposure lens disposed in the wall of one compartment, a light-tight entry to the interior of the other compartment, and an adjustable exposure device disposed in the aperture of the said partition.

8. A camera having an apertured partition forming compartments therein, an exposure lens disposed in the wall of one compartment, a rotatable exposure device disposed in the aperture of the partition.

9. A camera having an aperture partition forming compartments therein, an exposure lens disposed in the wall of one compartment, an exposure device supported by the partition and disposed in the aperture and having exposure apertures of different sizes, and means closed to the light to form a free entry to the device through the other compartment.

10. A camera having an apertured partition forming compartments therein, an exposure lens disposed in the wall of one compartment, an exposure device supported by the partition and disposed in the aperture and comprising graduated exposure apertures and closures therefor, and means impervious to the light to form a passageway for manipulation of the device from without the camera.

11. A camera having an apertured partition forming compartments therein, an exposure lens disposed in the wall of one compartment, an exposure device exposed in the aperture of the partition comprising an exposure opening and a hinged closure therefor, and means to form a light-tight passageway to adjust the device from without the camera.

12. A camera having an apertured partition forming compartments therein, an exposure lens disposed in the wall of one compartment, an exposure device disposed in the aperture of the partition, having an opening with one dimension greater than the other and rotatable in the partition to present the opening in any desired position, and means to form a light-tight passageway from without the camera to permit adjustment of said device.

13. A camera having an apertured partition forming compartments therein, an exposure lens disposed in the wall of one compartment, an exposure device rotatable in the aperture of the partition and comprising a plate formed with an exposure opening, and a hinged closure for the opening, and means forming a tight-light entry to adjust the device from without the camera.

14. A camera having an apertured partition forming compartments therein, an exposure lens disposed in the wall of one compartment, an exposure device disposed in the aperture of the partition and comprising a plate having an exposing opening, a hinged door for the opening, means releasably to hold the door in position, and means to form a light-tight entry to the device from without the camera.

15. A camera having an apertured partition forming compartments therein, an exposure lens disposed in the wall of one compartment, an exposure device disposed in the aperture of the partition and comprising a plate having an exposing opening, a hinged door for the opening, means to limit the movement of the door away from the plate, and means to form a light-tight entry to the device from without the camera.

16. A camera having an apertured partition forming compartments therein, an exposure lens disposed in the wall of one compartment, an exposure device disposed in the aperture of the partition and comprising a plurality of hinged doors each hinged on the one in front of it, and said doors being formed each with an exposing opening which is partially closed by the succeeding doors, and means to form a light-tight entry to the device from without the camera.

17. In a camera of the class described, the combination of a box, a lens disposed in the end of said box, an apertured plate forming a partition in said box, an exposure device disposed in the aperture of said plate, a support pivotally mounted upon the plate and of a size to cover the opening, means releasably to hold the support against the plate, and means to limit its movement outwardly therefrom, the said support being effective to hold a member in said aperture.

18. A camera having an apertured partition forming compartments therein, a lens disposed in the end of one compartment, and an exposure device comprising a plurality of supports hinged one upon the other, the supports being formed with openings and each rear hinged support covering a portion of the openings of the supports in front of it, and releasable means to lock each hinged support with respect to the support upon which it is hinged.

19. In a device of the class described, the combination with a box, a lens in one end thereof, of an apertured partition forming compartments in the box, and an exposure device supported by the partition in the aperture and rotatable with respect to the partition.

20. In a device of the class described, the combination with a box, a lens in one end thereof, of an apertured partition forming compartments in the box, an exposure device having an opening greater in length than width, and means in connection with the partition to support the device and to permit its rotation.

21. In a device of the class described, the combination with a box, a lens in one end thereof, of an apertured partition forming compartments in the box, an exposure device having an opening greater in length than width, a retaining rim secured to the partition in which the said device is freely rotatable, and a detent to limit the movement of the device in the said rim.

22. In a device of the class described, the combination with a box, a lens in one end thereof, of an apertured partition forming compartments in the box, an exposure device having an opening greater in length than width, a retaining rim secured to the partition in which the said device is rotatable, and having lugs projecting therefrom, and a detent secured to the said device positioned to engage with said lugs when the device is rotated.

23. In a device of the class described, the combination with a box, a lens in one end thereof, of an apertured partition forming compartments therein, an exposure device comprising an apertured rotatable plate disposed in the aperture of the partition, a hinged support to cover the aperture in the plate, and means to retain a card or member to be exposed in position when the support is swung away from the plate, the said support being swung to press the said member in position.

24. In an apparatus of the class described, an exposure device comprising a plurality of supports graduated in size, and each provided with an opening of a size smaller than the size of the next larger support, each smaller support being hinged upon the next larger.

25. In an apparatus of the class described, an exposure device comprising a plurality of apertured supports graduated in size, each smaller support being hinged upon the next larger, and means to position and retain a member to be exposed with respect to one of the apertures independently of the succeeding supports.

26. In an apparatus of the class described, an exposure device comprising a plurality of apertured supports graduated in size, each smaller support being hinged upon the next larger, and a guard extending about the aperture of one support outside of the next smaller support to provide a retaining guide for a member to be exposed.

27. In an apparatus of the class described, an exposure device comprising a plurality of apertured supports graduated in size, each smaller support being hinged upon the next larger, and a guard extending about the aperture of one support and having lugs or ears bent inwardly therefrom to engage the next smaller support to limit its outward movement.

28. In an apparatus of the class described, an exposure device comprising a plurality of apertured supports graduated in size, each smaller support being hinged upon the next larger, and means secured to one support extending outwardly therefrom to engage the next smaller support when it is moved outwardly.

29. In an apparatus of the class described, an exposure device comprising a plurality of apertured supports graduated in size, each smaller support being hinged upon the next larger, and means releasably to hold the supports together.

30. In an apparatus of the class described, an exposure device comprising a plurality of apertured supports graduated in size, each smaller support being hinged upon the next larger, and means releasably to hold the supports together, each hinged support being provided with a bent tip to facilitate its separation from the next larger support.

31. In an apparatus of the class described, an exposure device comprising a plurality of apertured supports graduated in size, each smaller support being hinged upon the next larger, and lugs extending from the faces of the supports, the lugs of adjacent supports being positioned to engage when the supports are in contact with each other and to hold them releasably in such position.

32. In an apparatus of the class described, an exposure device comprising a plurality of apertured supports graduated in size, each smaller support being hinged upon the next larger, the smallest support being also provided with an opening, and means secured to the said support to retain a member to be exposed in position over the opening.

33. In an apparatus of the class described, an exposure device comprising a plurality of apertured supports graduated in size, each smaller support being hinged upon the next larger, and a recessed retaining member secured to the smallest support and being adapted by reason of the recess to hold a member to be exposed about the opening in the support.

34. In an apparatus of the class described, an exposure device comprising a plurality of apertured supports graduated in size, each smaller support being hinged upon the next larger, and a magnetized member secured to the smallest support and adapted to retain a metal member to be exposed over said opening therein.

35. The combination with a camera of the class described having a partition therein to form separate compartments, means secured to the inside of one of the chambers to form retaining holders for exposure members, and means forming an entry to the compartment for the placing of members in any desired position when the compartment is closed to the light.

36. In a camera of the class described, the combination with a box closed to the light, of a partition forming compartments therein, an exposure device for different sized members to be exposed adjustable in position in the partition, holders for exposure members of different sizes comprising bent metal bands secured to the walls inside of the compartment, and means to form an entry to the interior of the compartment in which the holders are disposed whereby the members may be placed and adjusted in position.

37. In a camera of the class described, the combination with a box closed to the light, of a partition forming compartments therein, an exposure device for members to be exposed to the light, holders in one compartment for such members, a fluid receptacle having a connection with the compartment closed to the light, and means to form a light-tight entry to the said compartment whereby the said members may be exposed and inserted in said receptacle.

38. The combination with a camera, of an exposure device for members of different sizes, holders for unexposed members in the camera, a fluid receptacle connected with the camera, and means forming a light-tight entry to permit access to be had to the interior thereof to place the unexposed members in said device and to place the exposed members in the said receptacle.

39. The combination with a camera, of an exposure device for members of different sizes, holders for unexposed members in the camera, a fluid receptacle, and means to secure the receptacle to the camera, the camera being provided with an opening registering with an opening in the receptacle.

40. The combination with a camera, of an exposure device for members of different sizes, holders for unexposed members in the camera, a fluid receptacle, means rotatably to secure the receptacle to the camera, the receptacle being formed with a plurality of separate chambers, and the camera being provided with an opening which registers with the chambers of the receptacle in one rotated position.

41. The combination with a camera, of an exposure device for members of different sizes, holders for unexposed members in the camera, a fluid receptacle with separate chambers, means rotatably to secure the receptacle to the edge of the camera so one chamber is clear of the edge, and a lid hinged upon the camera to cover the extending portion.

42. The combination with a camera, of an exposure device for members of different sizes, holders for unexposed members in the camera, a fluid receptacle with separate chambers, means rotatably to secure the receptacle to the edge of the camera so one chamber is clear of the edge, a lid hinged upon the camera to cover the extending portion, the camera being provided with an opening to register with one of the chambers, means impervious to light to permit access to be had to the interior of the camera and to the chamber of the receptacle through the camera, and means to remove members from the receptacle on the outside of the camera.

43. A camera comprising a box with a light-tight entry, a frame in the box, and a plurality of plate holders mounted on the frame and manually adjustable through the entry.

44. A camera having a compartment with a light-tight entry, and a device having members provided with graduated exposure apertures mounted inside of the said compartment, the said members being adjustable to or from operative position through the entry.

45. A camera comprising a light-tight compartment, a plate holding frame inside of said compartment, and a plate holder hinged to said frame and having an exposure aperture therein.

46. A camera comprising a light-tight compartment, a transverse frame within said compartment, a plate or card holder mounted on said frame and having an exposure opening therein, and a hinged device for holding the plate or card in proper position with respect to said exposure opening.

47. A camera having a compartment, a frame inside of said compartment having an exposure opening, a hinged back plate, and means for limiting the movement of said back plate from said frame.

48. A camera comprising a transverse support within the same, a plate holder rotatably mounted on said transverse support, and an auxiliary plate holder hinged to said first named plate holder.

49. A camera comprising an interior transverse support, a plate holder mounted on said support, having decorative apertures near the edges of the exposure opening in said plate holder.

50. A camera having an apertured partition forming compartments therein, an exposure lens in the wall of one compartment, an exposure device disposed in the aperture of the partition comprising a plate having an exposure opening, means releasable to hold the plate in position, and means forming a light-tight entry to the exposure device in the other compartment from without the camera.

51. A camera having an apertured partition forming compartments therein, an exposure lens in the wall of one compartment, the aperture in the partition forming an exposure aperture, a closure removably fastened to the partition to close the opening, and means to form a light-tight entry to the device from without the camera.

52. A camera having an apertured partition forming compartments therein, an exposure lens in the wall of one compartment, an exposure device disposed in the aperture of the partition comprising a series of graduated and removably fastened plates, and means to form a light-tight entry to the device from without the camera for adjusting the plates.

53. In an apparatus of the class described, an exposure device comprising a plurality of apertured supports graduated in size, each smaller support being adjustably connected to the next larger, and means releasable to hold the supports together in an upright position.

54. A carrier for sensitized elements having a supporting plate provided with an opening, and having a second plate pivoted thereto to hold a sensitized element registering with said opening, and projecting guides on said supporting plate secured at the opposite sides of said opening and adapted to direct the position of the sensitized element carried by the second aforesaid plate as said second plate and sensitized element are being swung into place for exposure.

55. In combination with an apertured supporting plate, of a second apertured plate hinged to the first and adapted to hold a sensitized element in register with the aperture in the first, a third apertured plate hinged to the second and adapted to hold a sensitized element in register with the aperture of the latter, and means on said third plate to hold a sensitized element in register with its aperture, the apertures in the plates decreasing in size in the order in which the plates are here named.

56. In combination with an apertured supporting plate, of a second apertured plate hinged to the first and adapted to hold a sensitized element in register with the aperture of the first, a third apertured plate hinged to one of the other two plates and adapted to hold a sensitized element in register with the opening of the second plate, and means for supporting a sensitized element on said third plate and in register with its aperture, the apertures in the plates being such as to vary in succession the surface of the sensitized element exposed therethrough.

57. A means for exposing sensitive elements comprising a series of apertured plates hinged together and adapted to fold one upon the other so that a sensitive element may be clamped between any two adjacent plates and exposed through the apertures of the plates in front of it, the size of the apertures of the plates decreasing successively from front to rear of the series, and means for holding a sensitive element for exposure through the aperture of the rearmost plate.

58. A camera comprising a box, a frame fixed in the box forming a partition and having an opening therethrough, and a device having members provided with graduated exposure apertures mounted on the frame and adjustable to or from operative position in the said opening thereof.

In testimony whereof we have signed our names to this specification, in the presence of two subscribing witnesses, on this ninth day of April A. D. 1912.

MANDEL MANDEL.
LOUIS MANDEL.

Witnesses:
    LOUIS R. ISAACSON,
    CARL A. DYBERG.